United States Patent
Gyure et al.

(10) Patent No.: US 9,594,670 B2
(45) Date of Patent: Mar. 14, 2017

(54) MANAGING SOFTWARE DEPENDENCIES DURING SOFTWARE TESTING AND DEBUGGING

(75) Inventors: Wesley J. Gyure, Wake Forest, NC (US); David G. Robinson, Cary, NC (US); Adam Tate, Raleigh, NC (US); Nancy J. Whinham, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2413 days.

(21) Appl. No.: 12/167,446

(22) Filed: Jul. 3, 2008

(65) Prior Publication Data
US 2010/0005455 A1 Jan. 7, 2010

(51) Int. Cl.
G06F 11/36 (2006.01)
G06F 9/54 (2006.01)
G06F 9/44 (2006.01)

(52) U.S. Cl.
CPC ........ G06F 11/3664 (2013.01); G06F 9/4425 (2013.01); G06F 9/54 (2013.01); G06F 11/3636 (2013.01); G06F 9/547 (2013.01); G06F 11/3612 (2013.01); G06F 11/3688 (2013.01); G06F 11/3696 (2013.01)

(58) Field of Classification Search
CPC . G06F 9/54; G06F 9/547; G06F 11/36; G06F 11/3612; G06F 11/362; G06F 11/3636; G06F 11/3664; G06F 11/3668; G06F 11/3688; G06F 11/3696
See application file for complete search history.

(56) References Cited

U.S. PATENT DOCUMENTS

| 4,819,233 A * | 4/1989 | Delucia | G06F 11/3688 714/E11.209 |
| 4,845,665 A * | 7/1989 | Heath | G06F 8/38 703/21 |

(Continued)

OTHER PUBLICATIONS

"iWay Emulation Adapter (3270/5250) User's Guide Version 5 Release 5," iWay Software and Information Builders, Copyright 2005, <http://docs.oracle.com/cd/E19636-01/817-7938-05/817-7938-05.pdf> all pages (total of 94 pages).*

(Continued)

*Primary Examiner* — Geoffrey St Leger
(74) *Attorney, Agent, or Firm* — Kunzler Law Group; David Woycechowsky

(57) ABSTRACT

A solution for managing software dependencies during software testing and debugging includes a capture module configured to capture a software call stack of a software execution environment, each software call of the software call stack including a call signature and a call result. The solution defines a set of proxied software calls within the software call stack suitable for simulating conversation responses to runtime software calls by a target application. Once a set of proxied software calls is defined, a playback module recognizes runtime software calls by the target application that are within the set of proxied software calls and responds to the recognized runtime software call with a captured call result corresponding to the recognized software call.

19 Claims, 7 Drawing Sheets

(56) References Cited

U.S. PATENT DOCUMENTS

| | | | |
|---|---|---|---|
| 5,317,740 A * | 5/1994 | Sites | 717/129 |
| 5,491,800 A * | 2/1996 | Goldsmith et al. | 709/221 |
| 5,604,885 A * | 2/1997 | Denio | 703/27 |
| 5,794,047 A * | 8/1998 | Meier | 717/133 |
| 5,812,828 A * | 9/1998 | Kaufer | G06F 9/45504 703/22 |
| 5,822,563 A * | 10/1998 | Sitbon et al. | 719/330 |
| 5,862,362 A * | 1/1999 | Somasegar et al. | 703/21 |
| 5,881,267 A * | 3/1999 | Dearth et al. | 703/27 |
| 5,901,315 A * | 5/1999 | Edwards et al. | 717/124 |
| 5,956,483 A * | 9/1999 | Grate et al. | 709/203 |
| 5,970,248 A * | 10/1999 | Meier | 717/125 |
| 6,052,515 A * | 4/2000 | Bruckhaus | 716/139 |
| 6,282,702 B1 | 8/2001 | Ungar | 717/148 |
| 6,721,941 B1 | 4/2004 | Morshed et al. | 717/127 |
| 6,772,107 B1 | 8/2004 | La Cascia et al. | 703/21 |
| 6,832,367 B1 * | 12/2004 | Choi | G06F 11/3664 714/E11.207 |
| 6,971,091 B1 * | 11/2005 | Arnold et al. | 717/145 |
| 7,107,578 B1 * | 9/2006 | Alpern | 717/124 |
| 7,155,728 B1 * | 12/2006 | Prabhu | G06F 9/547 719/310 |
| 7,350,194 B1 * | 3/2008 | Alpern | 717/124 |
| 7,380,235 B1 * | 5/2008 | Fathalla | G06F 11/3664 714/E11.207 |
| 7,441,236 B2 * | 10/2008 | Chon | G06F 11/261 714/E11.167 |
| 7,506,318 B1 * | 3/2009 | Lindo | G06F 11/3644 717/130 |
| 7,519,959 B1 * | 4/2009 | Dmitriev | 717/128 |
| 7,526,754 B2 * | 4/2009 | Bentolila | 717/124 |
| 7,617,327 B1 * | 11/2009 | Allam | G06F 9/54 370/389 |
| 8,813,079 B1 * | 8/2014 | Lindo | 718/100 |
| 2001/0049594 A1 * | 12/2001 | Klevans | H04L 41/12 703/14 |
| 2002/0038388 A1 * | 3/2002 | Netter | G06F 9/4443 719/318 |
| 2002/0129337 A1 * | 9/2002 | Evans et al. | 717/124 |
| 2002/0199173 A1 * | 12/2002 | Bowen | 717/129 |
| 2003/0164850 A1 * | 9/2003 | Rojewski | G06F 17/30899 715/733 |
| 2003/0204779 A1 * | 10/2003 | Belenger | G06F 11/3696 714/22 |
| 2004/0078691 A1 * | 4/2004 | Cirne et al. | 714/38 |
| 2004/0111708 A1 * | 6/2004 | Calder et al. | 717/131 |
| 2004/0243338 A1 * | 12/2004 | Sabiers et al. | 702/122 |
| 2005/0010661 A1 * | 1/2005 | Southam et al. | 709/224 |
| 2005/0021289 A1 * | 1/2005 | Robertson | G06F 11/3696 702/182 |
| 2005/0187740 A1 * | 8/2005 | Marinescu | 703/1 |
| 2005/0188358 A1 * | 8/2005 | Johnson et al. | 717/129 |
| 2005/0193375 A1 * | 9/2005 | Larson | G06F 11/3612 717/127 |
| 2006/0005171 A1 * | 1/2006 | Ellison | 717/131 |
| 2006/0195823 A1 * | 8/2006 | Bentolila | 717/127 |
| 2006/0253739 A1 * | 11/2006 | Godefroid | G06F 11/3688 714/38.13 |
| 2007/0011656 A1 * | 1/2007 | Kumamoto | G06F 11/3664 717/124 |
| 2007/0043547 A1 * | 2/2007 | Plun et al. | 703/13 |
| 2007/0168744 A1 * | 7/2007 | Pal | G06F 11/3688 714/38.1 |
| 2007/0250820 A1 * | 10/2007 | Edwards et al. | 717/131 |
| 2008/0005782 A1 * | 1/2008 | Aziz | 726/3 |
| 2008/0141222 A1 * | 6/2008 | Alpern | 717/125 |
| 2008/0155338 A1 * | 6/2008 | Rusmanov | G06F 11/3696 714/38.13 |
| 2008/0178155 A1 * | 7/2008 | Gogh | G06F 11/3664 717/125 |
| 2009/0006064 A1 * | 1/2009 | Lin | G06F 17/5009 703/13 |
| 2009/0049421 A1 * | 2/2009 | Meijer | G06F 9/4426 717/100 |
| 2009/0133033 A1 * | 5/2009 | Lindo | G06F 11/0778 718/108 |
| 2009/0187791 A1 * | 7/2009 | Dowling | G06F 11/3636 714/38.14 |
| 2009/0265719 A1 * | 10/2009 | Meijer | G06F 9/45512 719/320 |
| 2010/0198799 A1 * | 8/2010 | Krishnan | G06F 11/3696 707/702 |

OTHER PUBLICATIONS

Mayfield, J., et al., Using automatic memoization as a software engineering tool in real-world AI systems, Proceedings of the 11th Conference on Artificial Intelligence for Applications, 1995, pp. 87-93, [retrieved on Oct. 21, 2016], Retrieved from the Internet: <URL:http://ieeexplore.ieee.org/>.*

Fünfrocken, S., Transparent migration of Java-based mobile agents: Capturing and re-establishing the state of Java programs, Personal Technologies, Jun. 1998, vol. 2, Issue 2, pp. 109-116, [retrieved on Oct. 21, 2016], Retrieved from the Internet: <URL: http://link.springer.com/article/10.1007/BF01324941>.*

"Java Platform Debugger Architecture Overview", http://java.sun.com/j2se/1.4.2/docs/guide/jpda/jpda.html, 2001.

* cited by examiner

MANAGING SOFTWARE DEPENDENCIES DURING SOFTWARE TESTING AND DEBUGGING

BACKGROUND OF THE INVENTION

Field of the Invention

This invention relates to testing software applications and has particular application in a software test environment where the software being tested has dependencies on many applications.

Description of the Related Art

Computing systems are comprised of many hardware and software components, and dependencies between software applications are now common. An application may depend on another application running on the same hardware enclosure, or on applications executing anywhere within a Local Area Network (LAN) or Wide Area Network (WAN). A thorough test of a software application and any interfaces or dependencies is important to the successful delivery of a software product. Conventional technology can require that the dependencies of an application be present in the system in order for the application to communicate with each of its dependencies.

In a production runtime environment the dependent applications are present and the maintenance of the dependencies is relatively low. Once the applications are loaded changes to the system are generally infrequent. For this reason a production system is a good testing environment. However, a production system running live code with real customers, and disrupting customers from doing their work due to a software bug can have a significant financial impact. A second issue with a production environment is that the production facilities may be geographically removed from the developer/testers or due to security reasons removed from developers and testers needing to test an application. A testing or debugging environment on the other hand is dynamic. Frequent changes in software and hardware are common. It is built and maintained specifically for the purpose of testing hardware and software. Access to a test system is generally more open than that of a production facility. In a test lab code can be instrumented using intrusive and non-intrusive tools. The system can be rebooted or restarted generally at will to debug or test an application.

A rigorous and exhaustive test, tests the logic paths, varying the inputs, validating the outputs, and testing the calls to and returns from dependent applications. A thorough test of the application may include testing under many different test scenarios such as: 1) initial power on, 2) rebooting, 3) reset, 4) power cycle, 5) hardware malfunction, and 6) software aborts to name a few.

For the same reasons that a test lab is a good test environment; the ability to frequently reboot, reset, and frequent hardware and software changes made at will make a test environment a difficult environment for testing. Due to the frequent reboots and code changes the testers need to assume that the dependencies and applications may not be running and therefore put checks in place to verify that the application dependencies are running. This can be an enormous task requiring many man-hours to verify that the dependencies are executing. If a dependency or application fails time is spent debugging the malfunction, and it may require special skills to determine the cause of the error; for example it may require someone with special knowledge of the dependent application to determine why the application failed. Due to the number of dependencies that a single application can have, determining the cause of the error can be very time consuming and resource intensive. In one implementation a developer writes scripts or programs to discover if the dependent application is loaded. While this automates the dependency discovery process, separate code must be written to check that each dependency is loaded and running before an application is tested. If a dependency is not running, a tester needs to investigate why.

Another issue that arises when testing is that the testers may not have access to all of the dependent applications, either due to licensing issues or the financial cost of acquiring the dependent applications for the testing environment.

Therefore, from the foregoing discussion, it should be apparent that a need exists for an improved testing tool. A test harness that can identify the dependent applications, input parameters and return values. A test harness that can present the software calls made by a target application to the dependent applications that the target application calls. Preferably, such a method would, in certain embodiments, include the capability to save and playback the same return value for a given set of input parameters.

SUMMARY OF THE INVENTION

The present invention has been developed to provide an apparatus, method and system for managing software dependencies during software testing and debugging.

The apparatus for managing software dependencies during software testing and debugging is provided with four modules configured to functionally execute the necessary steps to capture a software call stack, present the captured call stack to a user, recognize a software call, and respond with a captured call result.

The capture module, in one embodiment, captures a software call stack of a software execution environment, each software call of the software call stack comprising a call result. Each software call may also comprise a call signature.

The determination module, in one embodiment, defines a set of proxied software calls within the software call stack suitable for simulating conversation responses to runtime software calls by a target application.

The playback module, in one embodiment recognizes a software call by the target application that is within the set of proxied software calls and responds to the recognized software call with a captured call result corresponding to the recognized software call.

The determination module, in one embodiment includes a user interface module that presents the captured software call stack to a user. An identification module identifies in response to user input, the set of proxied software calls from the target application within the software call stack that reference an external software application, the target application defined by the user.

The capture module, in another embodiment stores each software call of the proxied set of software calls in persistent storage, each software call comprising at least one of a call name, a call parameter set, and a call result.

The capture module, in another embodiment captures a pre-call global variable set representative of a state of global variables in the execution environment prior to calling the external application. In addition, the capture module captures a post-call global variable set representative of a state of the global variables in the execution environment after calling the external application. Further the capture module captures the call result from the software stack after calling the external application and stores the pre-call global variable set, post-call global variable set, and call result.

The capture module, in another embodiment stores each call signature and a conversation result as a call signature record in a relational database. The captured call signature comprises a key for a table storing a plurality of software call stack records. The call signature comprises the call name, call parameter set, and the pre-call global variable set and the conversation result comprises the call result and the post-call global variable set.

The identification module, in another embodiment filters the call signature records retrieved from the relational database to produce a set of playback call records comprised of a call signature and a conversation result associated with the target application identified by the user.

The playback module, in another embodiment watches the runtime software stack for a runtime call signature originating from the target application to the external application. In addition the playback module searches the playback call records for an exact match between the runtime call signature and a call signature of the playback call records.

In one embodiment, the call signature comprises at least a call name, a call parameter set, and a global variable set. The playback module adjusts global variables in the software execution environment to reflect the values of global variables in the global variable set.

The method for managing software dependencies during software testing and debugging may, in one embodiment capture a software call stack of a software execution environment. Each software call of the software call stack comprises a call signature and a call result. Additionally, the method presents the captured software call stack to a user, by way of a user interface module, and defines a set of proxied software calls within the software call stack suitable for simulating conversation responses to runtime software calls by a target application. In addition, the method identifies in response to user input, a set of proxied software calls from the target application within the software call stack that reference an external software application. Further, the method recognizes a software call by the target application that is within the set of identified software calls and responds to the recognized software call with a captured call result corresponding to the recognized software call.

In one embodiment, the method includes capturing a software call stack to a user, and identifies in response to user input, the set of software calls from the target application, and within the software call stack that reference an external software application.

In another embodiment, the method stores each software call of the software call stack in persistent storage, each software call comprising at least a call name, a call parameter set, and a call result.

The capture method, in another embodiment, captures a pre-call global variable set representative of a state of the global variables in the execution environment prior to calling the external application. Further the method includes capturing a post-call global variable set representative of a state of the global variables in the execution environment after calling the external application. In addition the method captures the call result from the software stack after calling the external application and storing the pre-call global variable set, post-call global variable set, and call result.

In another embodiment, the method stores each call signature and a conversation result as a call signature record in a relational database. The captured call signature comprises a key for a table storing a plurality of software call stack records. The call signature comprises the call name, call parameter set, and the pre-call global variable set. The conversation result comprises the call result and the post-call global variable set.

The method for managing software dependencies during software testing and debugging may, in one embodiment, filter the call signature records retrieved from the relational database to produce a set of playback call records. The records comprise a call signature and a conversation result associated with the target application identified by the user.

The method, may in one embodiment, watch the runtime software stack for a runtime call signature originating from the target application to the external application. Additionally, the playback method may search the playback call records for an exact match between the runtime call signature and a call signature of the playback call records.

The method may, in another embodiment, adjust global variables in the software execution environment to reflect the values of global variables in the global variable set.

The system for managing software dependencies during software testing and debugging, in one embodiment may, include a processor, and memory in communication with the processor. The memory may comprise a java virtual machine (JVM) configured to execute at least one target application and one or more java software applications external to the target application. The JVM configured to implement a Java Platform Debugger Architecture (JPDA) and execute a test harness plugin. The system, may include the test harness java plugin comprising, a capture module configured to capture a software call stack of a software execution environment. Each software call of the software call stack may comprise a call signature and a call result.

The method for managing software dependencies during software testing and debugging may, in one embodiment, provide a set of proxied software calls from a target application within a software call stack that reference an external software application. The software call stack captured from a first software execution environment, and each software call of the software call stack comprise a call name, a call parameter set, and a call result. In addition the method may include executing the target application within a second software execution environment. In another embodiment the external software application is inaccessible to the target application executing within the second software execution environment. The method may, recognize a software call by the target application that is within the set of provided software calls, and respond to the recognized software call with a captured call result. The captured call result corresponding to the recognized software call, such that the captured call result substitutes for a runtime call result of the software call.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
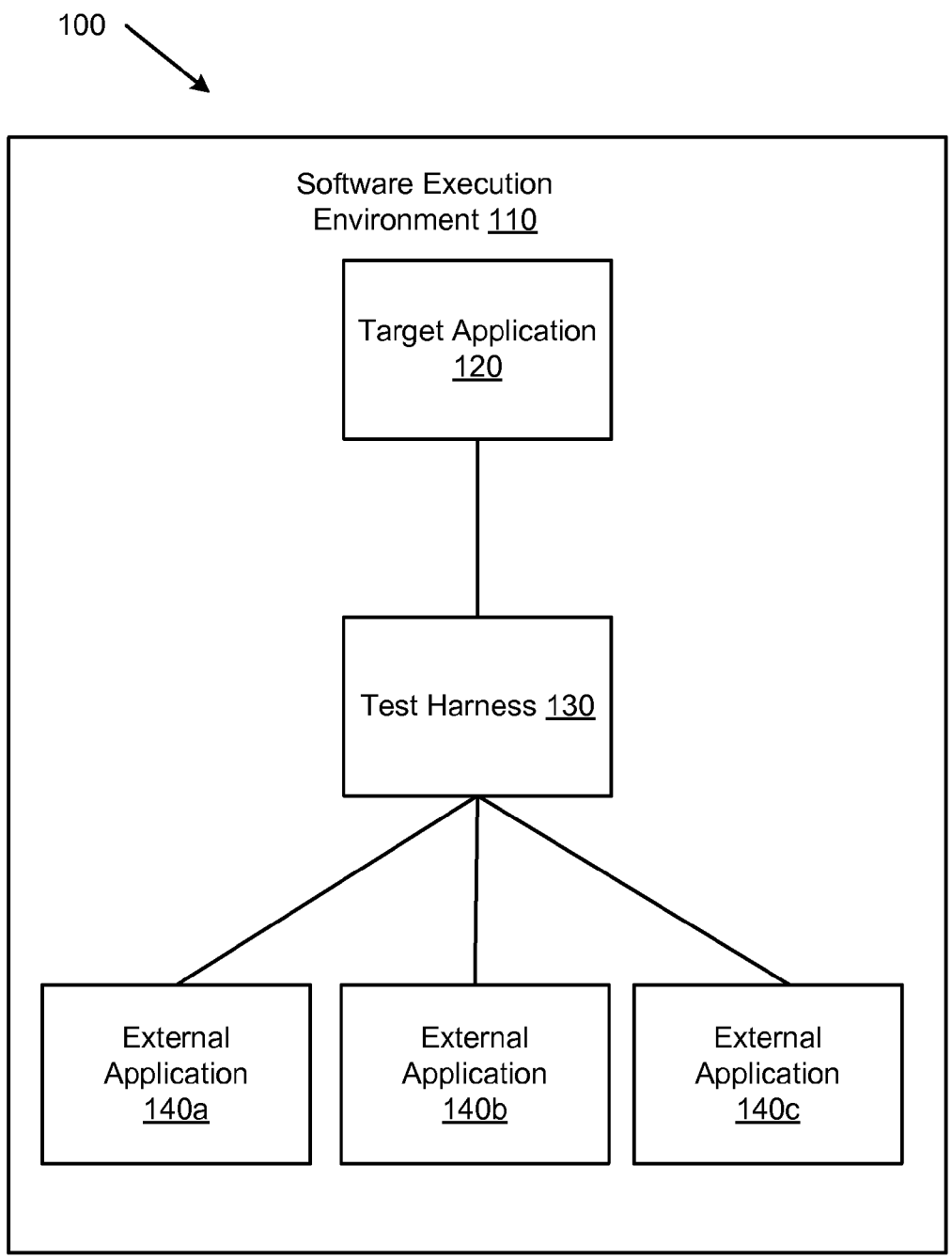
FIG. 1 is a block diagram illustrating one embodiment for managing software dependencies during software testing and debugging.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and maybe embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of an apparatus 100 for managing software dependencies during software testing and debugging. The apparatus 100 includes a target application 120, a test harness 130 and external applications 140a-c executing in a software execution environment 110. The software execution environment 110 may include an Operating System (OS), and supporting basic editors, debuggers, user interface tools, and other testing tools. The OS may be Windows, Macintosh, UNIX, Linux or the like. In one embodiment, the OS is configured to support a Java Virtual Machine (JVM) environment.

The target application 120 may comprise a workstation application, a servlet, desktop application, a server application, a client application, a web-based application, and the like. The target application 120 is configured to run on similar computer hardware to that used in a production environment.

In one embodiment, a target application 120 is written in a programming language such as Java, C++, C, or the like and executes in the software execution environment 110. The target application 120 includes at least one dependency on an external application 140a-c. A dependency exists when the target application 120 initiates a software call to a function or method of the external application 140a-c. The software call from the target application 120 to a function or method of the external application 140a-c contains the function call name, and the function call parameter set. The parameter set comprises values or pointers to values that the target application 120 supplies to the function in the external application 140a-c.

In addition, the target application 120 may include global variables used to maintain additional data for the function or method of the external application 140a-c. The called function of the external application 140a-c retrieves the parameter values passed from the target application 120, and may optionally adjust or read the values of the global variables. The called function returns a call result to the target application.

In one embodiment, the target application 120 may be a database application, spreadsheet application, web application, or the like, and interfaces with other applications within the same physical enclosure or outside of the physical enclosure, and is connected through a network. The target application 120 may need to pass data, control messages, values, or the like to external applications 140a-c running on the same physical enclosure or anywhere on a network. The target application 120 relies on one or more external applications 140a-c to complete the purposes and functions of the target application 120. This reliance is referred to herein as a dependency. The interface between the target application 120 and external applications 140a-c may be defined using a variety of protocols or techniques including remote procedure calls, messaging frameworks, an Application Programming Interface (API), or the like.

In dependencies that utilize an API of the external application 140a-c, the API includes a function name and parameter set comprising values or pointers for passing information between the target application 120 and the external applications 140a-c. In this embodiment, the target application 120 is dependent on the external applications 140a-c to complete parts of the processes of the target application 120. The target application 120 calls an external application 140a-c. The external application 140a-c retrieves the parameter set and executes the dependant code. The external application 140a-c then returns control to the target application 120. As explained above, however, the external application 140a-c may not exist or may not be maintained to the proper version in a test lab that is testing the target application 120.

The external applications 140a-c may execute in the software execution environment 110. In one embodiment, the external applications 140a-c may be a workstation application, a servlet, a desktop application, a server application, a client application, a web-based application, and the like. The external applications 140a-c are configured to run on similar computer hardware to that used in a production environment. The external applications 140a-c may contain code that a target application 120 is dependent upon. In one embodiment, the external applications 140a-c contain a function that the target application 120 will call through an API.

An external application 140a-c is a software application that a target application 120 needs to have loaded. The external application 140a-c is responsive to software calls from the target application 120. The target application 120 depends on the external application 140 for computing and returning of values.

In one embodiment, the software execution environment 110 may comprise a production environment consisting of a small or large system of laptops, workstations, or mainframe computer. The software execution environment 110 is configured to execute applications, and a Database Management System (DBMS). The software execution environment 110 may be connected to the World Wide Web (WWW), the target application 120 may be executing in a geographically removed location from the external applications 140a-c. In another embodiment, the software execution environment 110 may be a test environment. The testing environment containing the target application 120, and may contain none or some of the external applications 140a-c.

A test harness 130 executes in the software execution environment 110 and watches the software calls of the target application 120. The test harness 130 may comprise a Java plugin configured to watch the software stack calls between target application 120 and an external application 140a-c.

In one embodiment, an apparatus for managing software dependencies during software testing and debugging the test harness 130 executes within the software execution environment 110 to enable the target application 120 to be tested with or without executing an external application 140a-c. The test harness 130 serves as a proxy for the external applications 140a-c, provided conversations between the target application 120 and an external application 140 have been previously captured. The test harness 130 is configured to respond to software calls from the target application 120 to the external application 140a-c in the same manner as the external application 140a-c would respond if the external application 140a-c was responding to the software call. In this manner, the test harness 130 is used for testing of the target application 120 without executing the external application 140a-c. The external application 140a-c need not even be present in the software execution environment 110.

In one embodiment, the test harness 130 is configured to capture conversations between the target application 120 and one or more external applications 140a-c. A conversation includes the messages between the target application 120, and an external application 140a-c, and the messages back from the external application 140a-c to the target application. The test harness stores the conversations such that they can be retrieved for subsequent testing scenarios.

In one embodiment, the test harness 130 presents captured conversations to a user in the form of a captured software call stack. The user identifies conversations in the captured software call stack that correspond to a software dependency upon a particular external application 140a-c. The identified conversations define a proxied set of software calls that the test harness 130 uses to simulate the conversation responses from the particular external application 140a-c.

During testing of the target application 120, the test harness 130 watches conversations between the target application 120 and the external applications 140a-c for a match of the user-identified conversation. This match occurs when the software calls on a software call stack match the proxied set of software calls for the user-identified conversation. When a match occurs, the test harness 130 manages the software dependency.

In one embodiment, the capture module 220 captures the software call from the target application 120 to the external application 140a-c during execution of the target application 120. To perform the capture, the capture module 220 requires that the external application 140a-c be executing and able to respond to the software call. In this embodiment, no code additions or modifications to the target application 120 or external application 140a-c are required. In one embodiment, the capture module 220 watches the stack flow of a call stack, captures the software call and saves the software call in the DBMS.

The external application 140a-c, picks up the value of the parameters, and fulfills the software call. The external application 140a-c returns the call result to the target application 120. Once the call result is on the call stack, the capture module 220 captures the call result value. With the captured call result, the capture module 220 has the complete conversation. In one embodiment, the capture module 220 saves the captured conversation in a DBMS record.

Exemplary pseudo code below illustrates the function of the capture module 220 in capturing the software call stack, comprised of a call name, a call parameter set, and a call result. Optionally, the software call stack may include a pre-call global variable set, and a post-call global variable set.

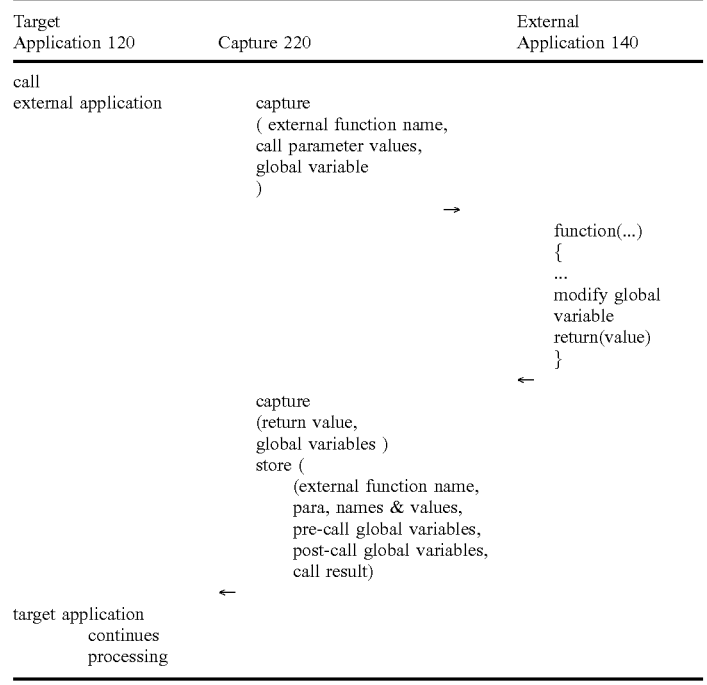

Figure 2:
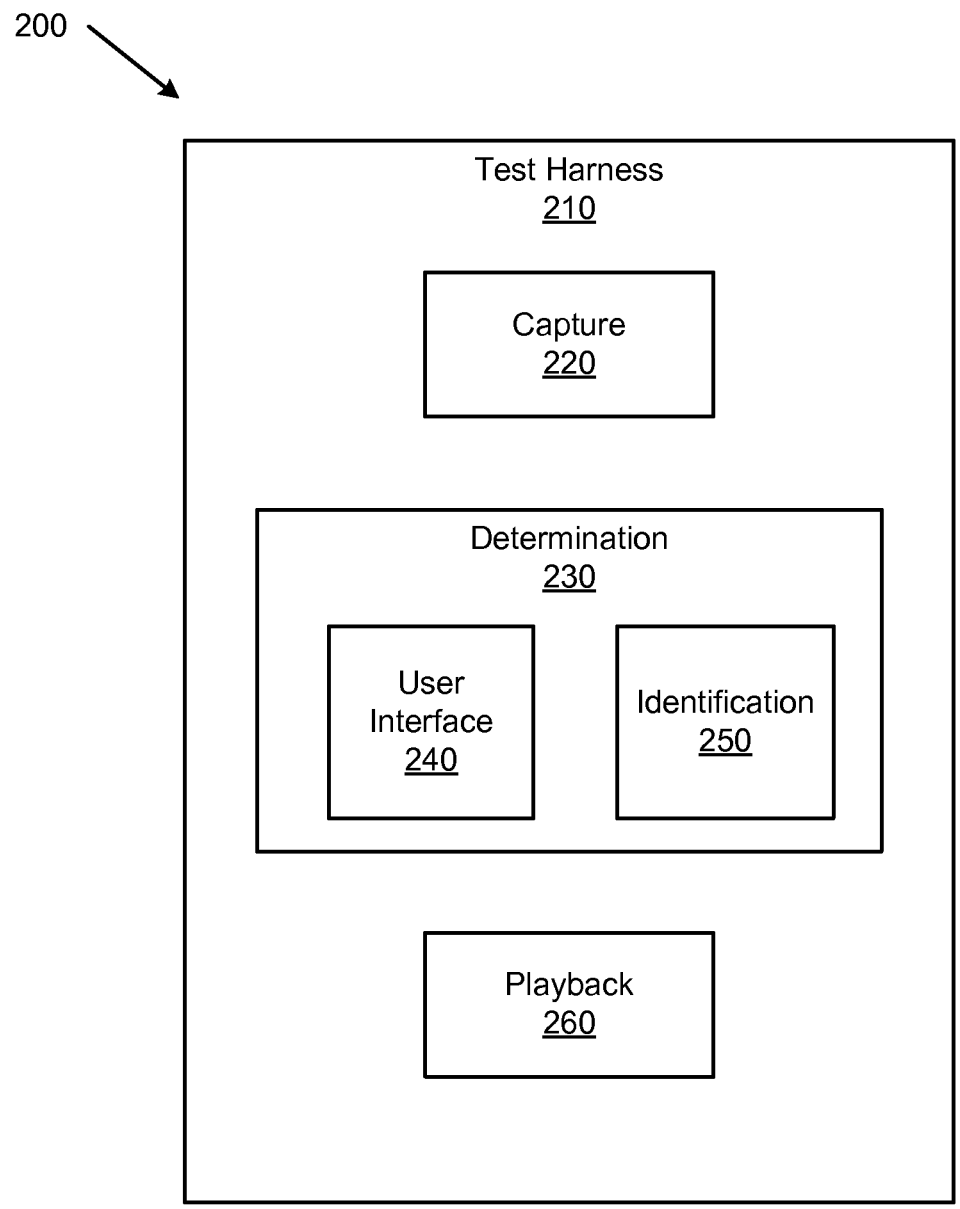
FIG. 2 is a schematic block diagram illustrating one embodiment of a test harness for managing software dependencies during software testing and debugging.

FIG. 2 illustrates one embodiment of a test harness 210 for managing software dependencies during software testing and debugging the test harness 210 that includes: a capture module 220, a determination module 230, a user interface module 240, an identification module 250, and a playback module 260.

In one embodiment, the capture module 220 stores each software call from the target application 120 to the external application 140a-c in a DBMS record. The software call, in one embodiment comprises, a call name, a call parameter set, and a call result. Optionally, the software call may also include a set of global variables. The software call is unique for each software call to an external application 140a-c.

In one embodiment, the determination module 230 identifies a set of software calls within the software call stack suitable for simulation of a conversation between a target application 120 and an external application 140a-c. These software calls, herein referred to as a set of proxied software calls simulate a conversation response to a runtime software call from the external application 140a-c back to the target application 120.

In one embodiment, the capture module 220 captures a set of software calls and passes the set of software calls to the determination module 230 and/or a storage repository (not shown). The determination module 230 identifies all of the software calls as a set of proxied software calls for simulation of a conversation response to a runtime software call.

In another embodiment, the determination module 230 may through programmed logic identify some or all of the software calls as a set of proxied software calls. In addition to, or alternatively a software hard-coded switch may be selected to identify software calls as proxied calls for simulation. In this embodiment, recompiling and relinking of the determination module 230 may be necessary to modify the hard-coded switch.

Advantageously, the present invention saves time needed to debug test software by reducing the need to install, update, maintain, and replicate the external applications 140*a-c* in every test environment. The determination module 230 communicates with the playback module 260 and/or a storage repository (not shown) to provide the proxied software calls.

The playback module 260 serves as proxy for one or more external applications 140*a-c* that the target application 120 may depend on. In one embodiment, the playback module 260 operates with a target application 120 in a software execution environment 110 that does not include one or more of the external applications 140*a-c*. The playback module 260 communicates with the storage repository to retrieve the set of proxied software calls and respond to software calls from the target application 120 to the external application 140*a* on behalf of the external application 140*a*.

In one embodiment, the playback module 260 monitors the software stack for runtime software calls that match one of the software calls in the set of proxied software calls. When a runtime software call matches a proxied software call, the playback module 260 responds to the software call from the target application 120 with a stored call result. The playback module 260 returns the call result instead of the external application 140*a-c* receiving the call and responding. In this manner, the operations of the external application 140*a-c* are simulated but the external application 140*a-c* is not required to be executing within or in communication with the execution environment 110.

In one embodiment, with the apparatus in playback mode, the playback module 260 executes a call to the Java Platform Development Architecture (JPDA) to watch the runtime software calls and compare these software calls with the set of proxied software calls.

In one embodiment, the user interface module 240 enables a user to interact with the test harness 210 to define the proxied set of software calls. The user interface module 240 communicates with the capture module 220 and/or a storage repository (not shown) to access stored software calls. In one embodiment, the user interface module 240 permits the user to select from a set of captured software calls, the software calls that the user wants to have simulated. Alternatively, or in addition, the user interface module 240 allows the user to define the set of proxied software calls prior to the capture of the software calls by the capture module 220.

In one embodiment, the user interface module 240 presents the captured software calls to a user in a user interface. The user interface may be a graphical user interface (GUI), text file, a command line interface, or the like. In such an embodiment, the capture module 220 may capture all software calls from the target application 120 to any of the external applications 140*a-c*. The user interface module 240 may then allow the user to select the set of proxied software calls that will be simulated from among those captured software calls.

Alternatively, or in addition, the user interface module 240 may define a set of software calls that the capture module 220 watches for during a capture phase when both the target application 120 and one or more external applications 140*a-c* are executing. The user interface module 240 may permit the user to select all software calls from the target application 120 to a particular external application 140, select certain software calls from the target application 120 to a particular external application 140, or a combination of software calls from the target application 120 to two or more external applications 140*a-c* either in whole or in part.

The selection and presentation mechanisms used by the user interface module 240 may be implemented using a variety of user interface techniques well known to those of skill in the art, including drop-down boxes, summary-detail lists, and the like. The user identifies from the presented software call stack, proxied software calls to be simulated. As explained, in certain embodiments, certain proxied software calls may still need to be captured prior to performing the simulation. The proxied software calls may be stored in a playback record in the DBMS.

In one embodiment, the identification module 250 filters the software calls presented to the user. The identification module 250 may filter the software calls by call name, call parameter set, and/or call result. The user identifies from the presented software calls the set of proxied calls to simulate during runtime.

The pseudo code below illustrates the function of one embodiment of the playback 260 module in watching the runtime software call stacks.

| Target Application 120 | Playback 260 | External Application 140 |
|---|---|---|
| call external app | | |
| | If the call to external application is a match with the "software call stack" (function name, parameter values) then return "call result" ← else external app is called → function(...) .... | |
| target app continues ← | | |

Figure 3:
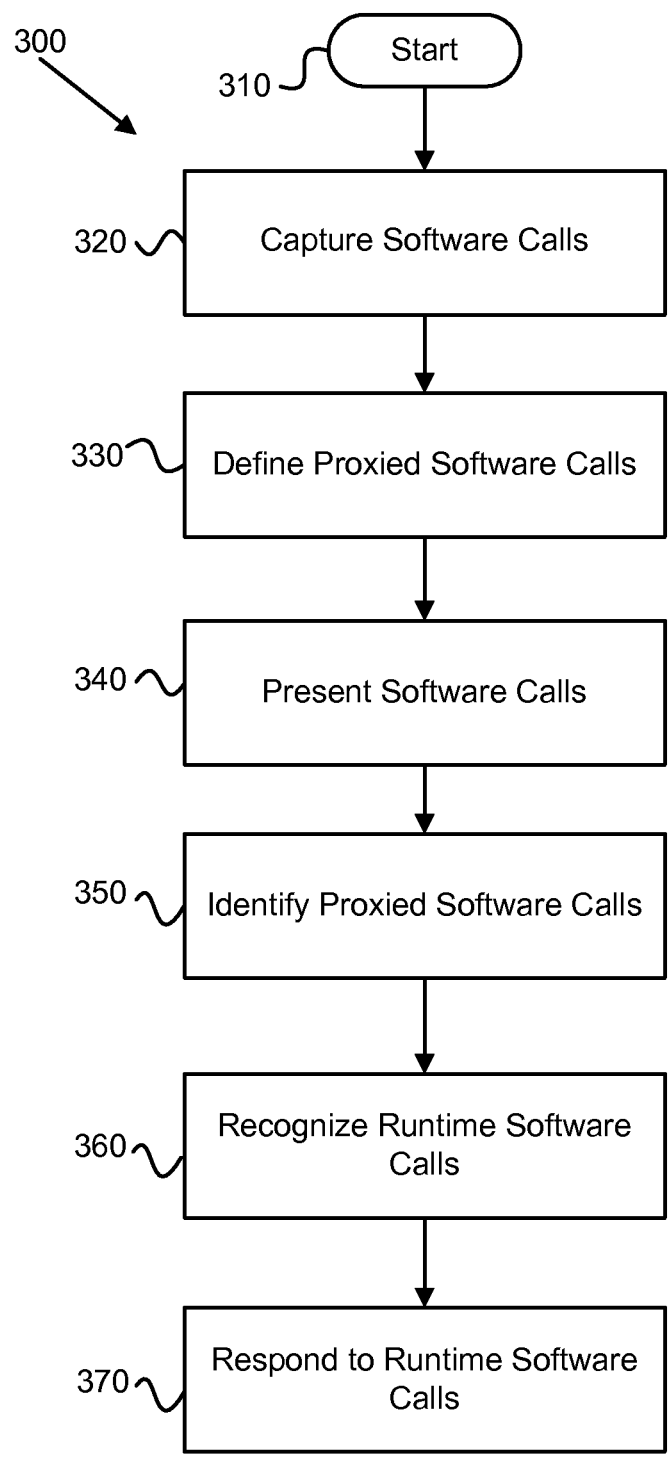
FIG. 3 is a schematic flow chart diagram illustrating one embodiment for managing software dependencies during software testing and debugging.

FIG. 3 illustrates one embodiment of a method 300 for managing software dependencies during software testing and debugging. The operations may be implemented by the executed operations of a computer program product. The method 300 begins 310 and the capture module 220 captures 320 software calls from a target application 120 with dependencies on an external application 140a-c. Optionally, the capture module 220 may store the captured software calls for presentation to the user. Next, the determination module 230 defines 330 a set of proxied software calls that can be used, or are suitable to simulate conversations between the target application 210 and one or more external applications 140a-c. For example, the determination module 230 in one embodiment distinguishes external software calls on the software call stack from internal software calls included on the call stack. External software calls may be suitable for simulating conversation responses where internal software calls may not be suitable, i.e. there may not be dependencies for the internal software calls.

The method 300 continues and the user interface module 240 presents 340 the set of proxied software calls and/or the captured software calls to the user. By interacting with the identification module 250 the user identifies 350 the set of proxied software calls. The user may accept the defined set presented or modify or refine the set as desired.

At this stage, the method 300 is set up to begin simulating conversations between the target application 120 and the one or more external applications 140a-c. Advantageously, the user interface module 240 provides the user with a high level of flexibility and control regarding which conversations are simulated. Consequently, the target application 120 can be tested with some, all, or none of the dependent external applications 140a-c operating or accessible to the software execution environment 120.

Figure 4:
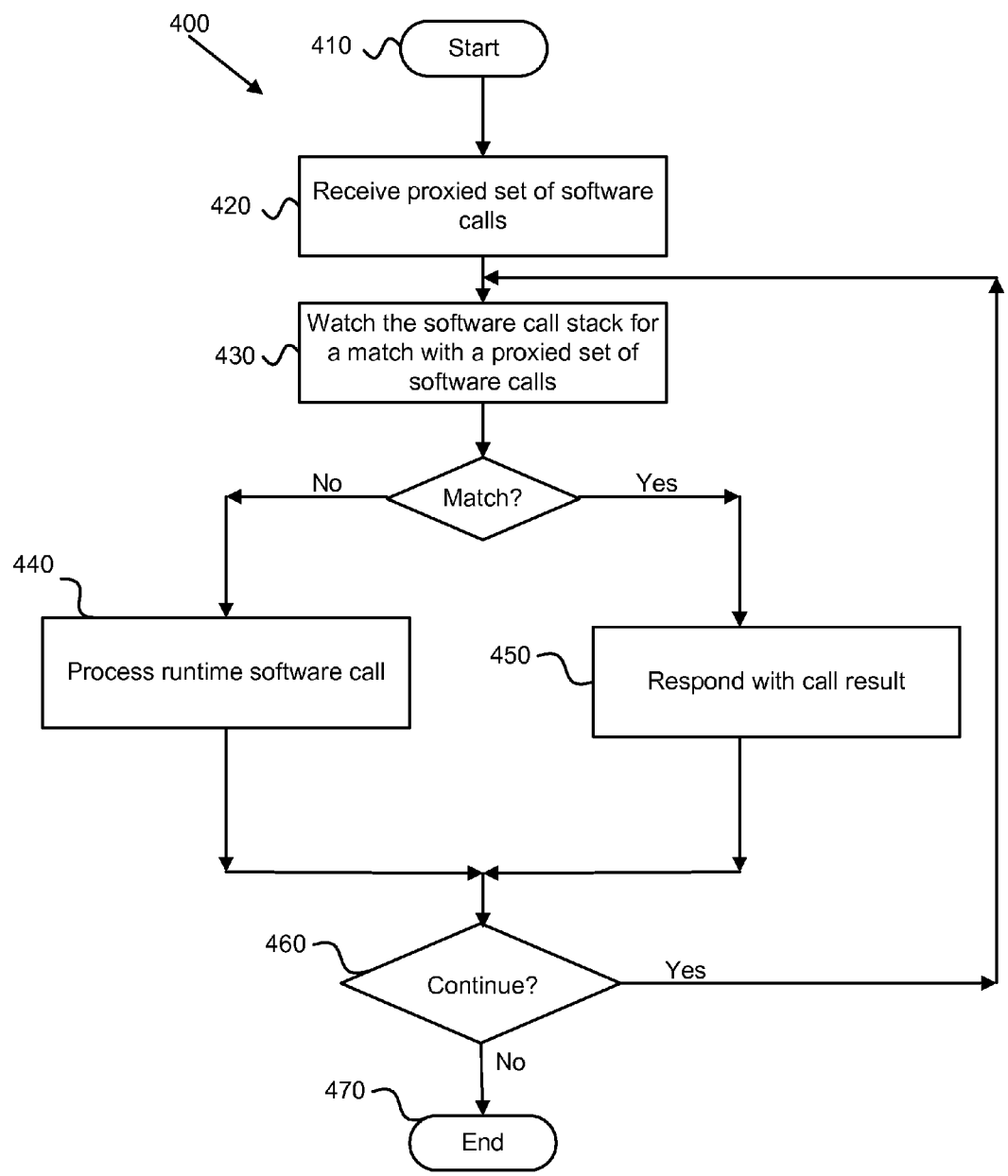
FIG. 4 is a detailed schematic flow chart diagram illustrating one embodiment for managing software dependencies during software testing and debugging.

Next, the target application 120 is tested and the playback module 260 recognizes 360 software calls made during runtime of the target application 120 that match members of the proxied set of software calls. The playback module 260 intercepts the calls and responds 370 to the software calls by providing the captured call result to the target application 120. FIG. 4 illustrates one embodiment, of a method 400 for managing software dependencies during software testing and debugging. The operations may be implemented by the executed operations of a computer program product. The method 400 begins 410 and the playback module 260 receives 420 a proxied set of software calls 420. The proxied set of software calls may come from the determination module 230.

Optionally, the playback module 260 receives 420 the proxied set of software calls 420 from a repository such as a database, a website, a data file, a configuration file, an XML file, a text file (not shown) or the like. At this stage the playback module 260 is setup to recognize a runtime software call by the target application 120. The method 400 continues and the playback module 260 watches 430 the software call stack for a match with a proxied software call.

Next, the playback module 260 recognizes 440 if there is a match between a runtime software call and a proxied software call. If a match 440 is recognized 360, the playback module 260 responds 370 to the runtime software call with the call result 450. Optionally, as part of responding, the playback module 260 may adjust global variables in order to more fully simulate the actions the external application 140a-c would perform. If a match is not recognized, the method 400 processes 440 the runtime software call normally. If the runtime software call does not match and the runtime software call is a call to an external application 140a-c, the external application 140a-c is called. Next, the method 400 determines 460 if testing is continuing, if so, the method 400 returns to watching runtime software calls, if not the method 400 ends 470.

Figure 5:
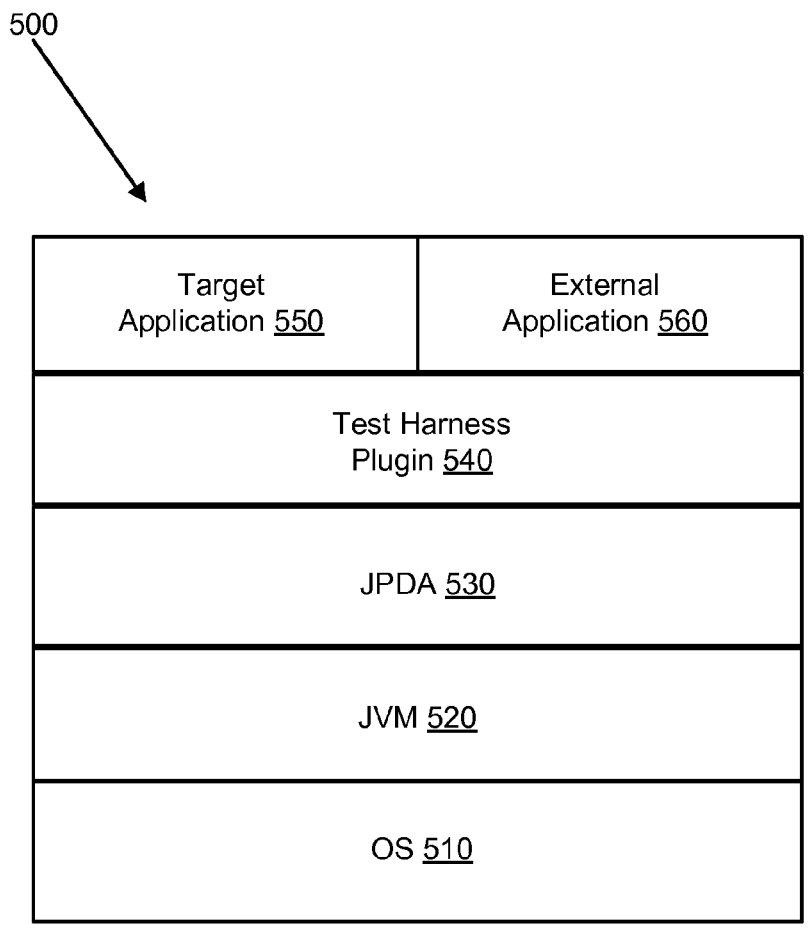
FIG. 5 is a block diagram of one embodiment for managing software dependencies during software testing and debugging.

FIG. 5 illustrates a schematic block diagram of one embodiment of a system 500 for managing software dependencies during software testing and debugging. The system is built on an Operating System (OS) 510 such as Windows, Macintosh, UNIX, Linux or the like. In one embodiment, the system 500 supports a Java Virtual Machine (JVM) 520 and a Java Platform Debugger Architecture (JPDA) 530. The system 500 is configured with a test harness plugin 540. The test harness plugin 540 in one embodiment includes the full functionality of the test harness 130 and/or test harness 210 described above. Specifically, the test harness 540 includes a capture module 220, an determination module 230, and a playback module 260. In addition, the test harness 540 is specifically configured to interface and operate with the JVM 520 and JPDA 530. The target application 550 and external application 560 are user level applications.

In certain embodiments of the system 500, one or more of the external applications 560, target application 550, capture module 220, and determination module 230 may not be included in the same system 500. Instead, these components may be distributed among other hardware or network devices in order to perform their respective functions. In this manner, the present invention may be implemented in a variety of configurations while still facilitating the management of software dependencies during software testing and debugging.

Figure 6:
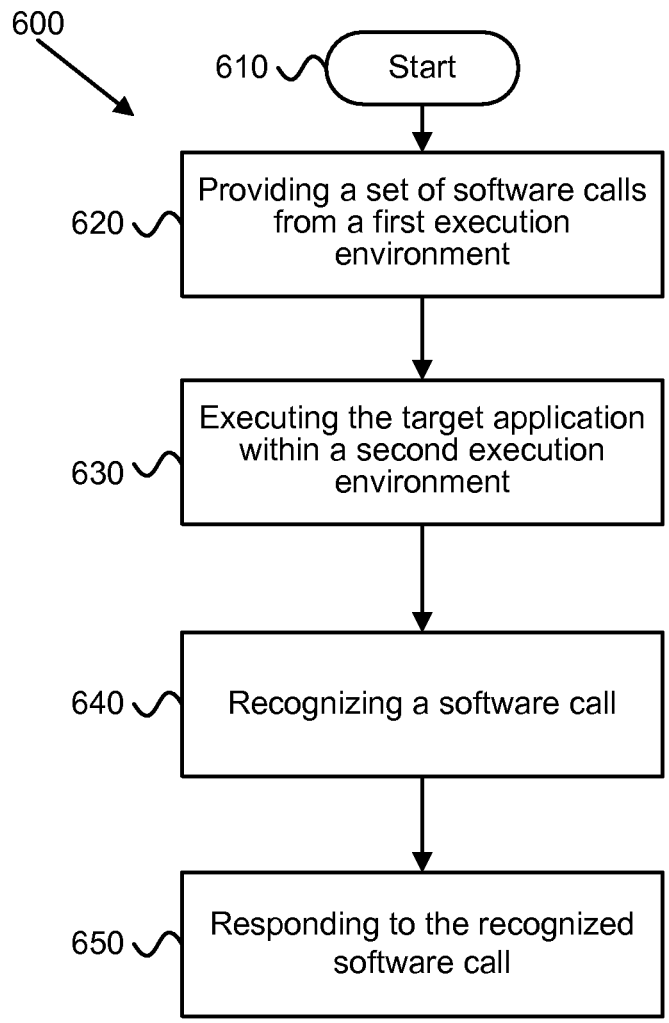
FIG. 6 is a schematic flow chart diagram illustrating another embodiment for managing software dependencies during software testing and debugging.

FIG. 6 illustrates one embodiment of a method 600 for managing software dependencies during software testing and debugging. The operations may be implemented by the executed operations of a computer program product. The method 600 begins 610 when a set of proxied software calls from a first software execution environment 110 is provided 620 from a source. Optionally, the set of proxied software calls may be provided from database, a website, a configuration file, XML file, text file (not shown) or the like.

In one embodiment, the second software execution environment (not shown) differs from a first software execution environment 110. The first software execution environment 110 may have the target application 120, test harness 130 and external applications 140a-c. The second software execution environment may have the target application 120, and test harness 130, but may lack some or all of the external applications 140a-c. The first software execution environment may be a production environment where a user captures the software call stack from a target application 120 to external applications 140a-c. The captured software call stack is transported to a second software execution environment (not shown). In this embodiment, the target application is debugged without the presence of the external applications 140a-c in the execution environment.

The target application 120 executes 630 in the software execution environment. The target application 120 makes a runtime software call to an external application 140a-c. In this embodiment, the second software execution environment 630 is executing and the application does not have access to the external application 140a-c. The playback module 260 recognizes 640 the runtime software call from the target application 120 to the external application 140a-c as one matching a member of the set of proxied software calls. The playback module 260 responds 650 by sending the call result to the target application 120. In one embodiment, this software call result is the software call result captured in the first software execution environment.

Advantageously, the capture 220 of the software call stack in a first execution environment provides the user with a high level of flexibility and control regarding which conversations are simulated. Consequently, the target application 120 can be tested with some, all, or none of the dependent external applications 140a-c operating or accessible to the software execution environment.

In another embodiment, the determination module 230 may read a configuration file such as an XML file, text file or the like to identify a set of proxied software calls. For example, the configuration file may define the set of proxied software calls as those calls directed towards a particular external application 140a. Alternatively, or in addition, the configuration file may define the set of proxied software calls as those calls directed towards an external application 140a having a certain characteristic. In this embodiment, the configuration file may be generated in a production environment and returned to a test environment minus the external applications 140a-c. This permits an engineer to debug a target application 120 in a test environment without the external applications 140a-c. Alternatively, an engineer in a test environment may generate test configuration files with a proxied set of software calls for distribution to production environments for software testing.

The pseudo code below illustrates the function of the playback 260 module in a second software execution environment. In one embodiment, the second software execution environment is an environment without the external applications 140a-c.

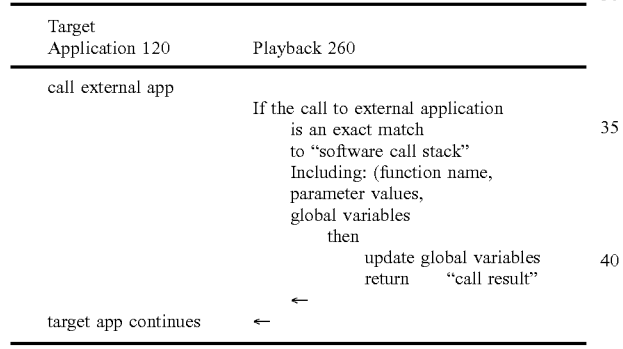

Figure 7:
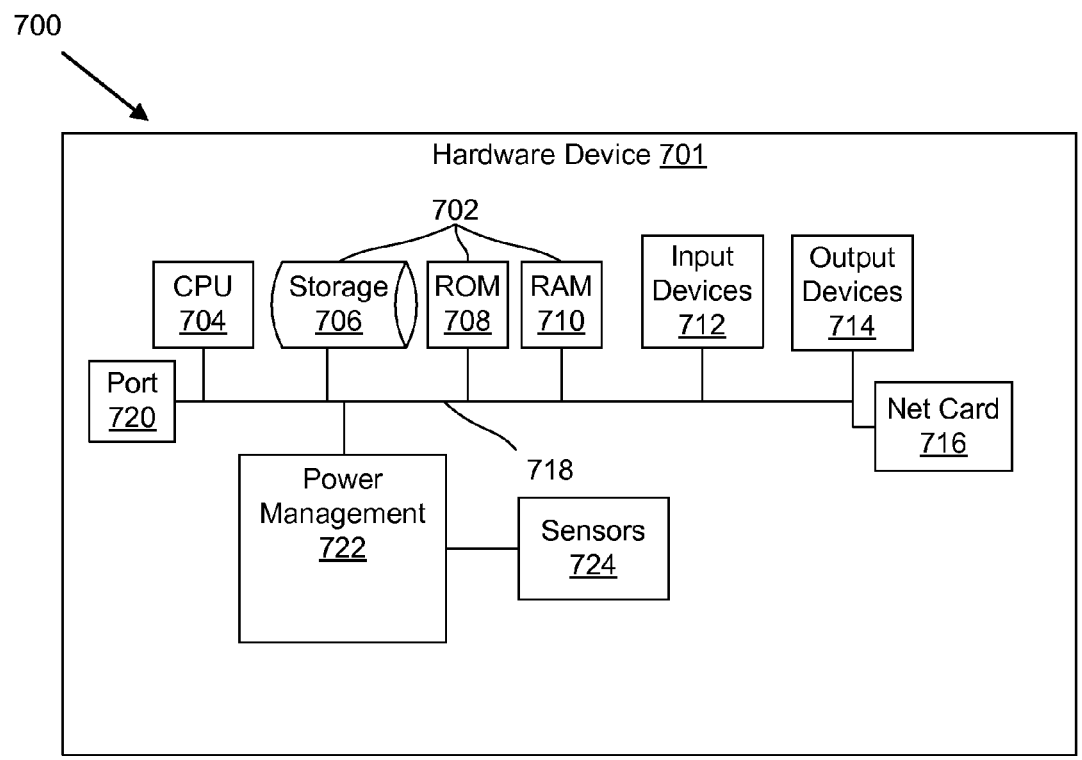
FIG. 7 is a block diagram of one embodiment of a hardware system capable of executing an embodiment for managing software dependencies during software testing and debugging.

FIG. 7 illustrates a schematic block diagram of one embodiment of an electronic device 701 in accordance with the present invention. In certain embodiments, the electronic device is a server computer. Nevertheless, the device may constitute any type of electronic equipment, including a server, a mainframe, a desktop computer, a tablet computer, a PDA, and the like.

The device, hereinafter by way of example a server may include one or more processors or CPUs 704. The CPU 704 may be operably coupled to one or more memory devices 702. The memory devices 702 may include a non-volatile storage device 706 such as a hard disk drive or CD ROM drive, a read-only memory (ROM) 708, and a random access volatile memory (RAM) 710.

The server in general may also include one or more input devices 712 for receiving inputs from a user or from another device. The input devices 712 may include a keyboard, pointing device, touch screen, or other similar human input devices. Similarly, one or more output devices 714 may be provided within or may be accessible from the server. The output devices 714 may include a display, speakers, or the like. A network port such as a network interface card 716 may be provided for connecting to a network.

Within an electronic device 701 such as the server, a system bus 718 may operably interconnect the CPU 704, the memory devices 702, the input devices 712, the output devices 714, the network card 716, and one or more additional ports. The ports may allow for connections with other resources or peripherals, such as printers, digital cameras, scanners, wireless devices, and the like.

In the depicted embodiment, the CPU 704, Storage 706, ROM 708, and RAM 710 combined with Input Devices 712, Output Devices 714, and Network Card 716 may comprise a processing subsystem. In this embodiment, the first software execution environment 110 may execute in the depicted embodiment 700. The first software execution environment 110 may include a target application 120, test harness 130 and external applications 140a-c. The test harness 130 may include a capture 220 module, determination 230 module, and playback 260 module. The determination 230 module may include a user interface 240 module and identification 250 module.

In the electronic device 701 described above, the test harness plugin 540 may execute calls to the Java Platform Debugger Architecture (JPDA) 530. The test plugin 540 may call the JPDA to capture software calls from the target application 550 to the external applications 560 in the first software execution environment 110. The test harness plugin 540 may simulate calls from the target application 540 in a second software application environment.

What is claimed is:

1. An apparatus for managing software dependencies during software testing and debugging comprising:
   a capture module configured to
      capture a software call stack of a software execution environment, the software call stack comprising a plurality of software calls from a target application to one or more external applications, each software call of the software call stack comprising a call result, wherein the target application is dependent on the one or more external applications to complete, the one or more external applications excluding an operating system; and
      capture a pre-call global variable set representative of a state of global variables in the software execution environment prior to calling the one or more external applications and capture a post-call global variable set representative of a state of the global variables in the software execution environment after calling the one or more external applications;
   a determination module configured to define a set of proxied software calls within the captured software call stack suitable for simulating conversation responses to runtime software calls by the target application; and
   a playback module configured to monitor a runtime software call stack and determine whether a runtime software call by the target application to the one or more external applications is within the defined set of proxied software calls,
      the playback module configured to respond to the runtime software call with a captured call result corresponding to the runtime software call in response to recognizing the runtime software call as being within the defined set of proxied software calls,
      the playback module configured to ignore the runtime software call and to continue monitoring the runtime software call stack in response to not recognizing the runtime software call as being within the defined set of proxied software calls, and the playback module configured to adjust global variables in the software execution environment to reflect the values of global variables in the post-call global variable set, wherein all or a portion of the capture module, the determination module, and the playback module comprise one or more of logic hardware and executable code, the executable code stored on a computer readable storage medium.

2. The apparatus of claim 1, wherein the determination module comprises a user interface module configured to present the captured software call stack to a user, and an identification module configured to identify in response to user input, the defined set of proxied software calls from the target application within the captured software call stack that reference a particular external application of the one or more external applications, the target application defined by the user.

3. The apparatus of claim 1, wherein the capture module is further configured to store each software call of the defined proxied set of software calls in persistent storage, each software call comprising at least a call name, a call parameter set, and a call result.

4. The apparatus of claim 3, wherein the capture module is further configured to capture the call result from the runtime software stack after calling the one or more external applications and store the pre-call global variable set, post-call global variable set, and call result.

5. The apparatus of claim 4, wherein each software call comprises a call signature and wherein the capture module stores each call signature and a conversation result as a call signature record in a relational database, the captured call signature comprising a key for a table storing a plurality of software call stack records, the call signature comprising the call name, call parameter set, and the pre-call global variable set and the conversation result comprising the call result and the post-call global variable set.

6. The apparatus of claim 5, wherein the identification module is further configured to filter the call signature records retrieved from the relational database to produce a set of playback call records comprised of a call signature and a conversation result associated with the target application identified by the user.

7. The apparatus of claim 6, wherein the playback module is further configured to watch the runtime software call stack for a runtime call signature originating from the target application to the one or more external applications and to search the playback call records for an exact match between the runtime call signature and a call signature of the playback call records.

8. The apparatus of claim 7, wherein the call signature comprises at least one of a call name, a call parameter set, and a global variable set.

9. A method for managing software dependencies during software testing and debugging, the method comprising:

capturing a software call stack of a software execution environment, the software call stack comprising a plurality of software calls from a target application to one or more external applications, each software call of the software call stack comprising a call signature and a call result, wherein the target application is dependent on the one or more external applications to complete, the one or more external applications excluding an operating system;

capturing a pre-call global variable set representative of a state of global variables in the software execution environment prior to calling the one or more external applications and capturing a post-call global variable set representative of a state of the global variables in the software execution environment after calling the one or more external applications;

presenting the captured software call stack to a user, by way of a user interface module;

defining a set of proxied software calls within the captured software call stack suitable for simulating conversation responses to runtime software calls by the target application;

identifying in response to user input, a set of proxied software calls from the target application within the captured software call stack that reference a particular external software application of the one or more external applications;

monitoring a runtime software call stack and determining whether a runtime software call by the target application is within the identified set of proxied software calls;

responding to the runtime software call with a captured call result corresponding to the software call in response to recognizing the software call as being within the identified set of proxied software calls;

ignoring the runtime software call and continuing to monitor the runtime software call stack in response to not recognizing the runtime software call as being within the identified set of proxied software calls; and adjusting global variables in the software execution environment to reflect the values of global variables in the post-call global variable set.

10. The method of claim 9, wherein the target application is identified by the user.

11. The method of claim 9, further comprising storing each software call of the software call stack in persistent storage, each software call comprising at least a call name, a call parameter set, and a call result.

12. The method of claim 11, further comprising capturing the call result from the software stack after calling the one or more external applications and storing the pre-call global variable set, post-call global variable set, and call result.

13. The method of claim 12, further comprising storing each call signature and a conversation result as a call signature record in a relational database, the captured call signature comprising a key for a table storing a plurality of software call stack records, the call signature comprising the call name, call parameter set, and the pre-call global variable set and the conversation result comprising the call result and the post-call global variable set.

14. The method of claim 13, further comprising filtering the call signature records retrieved from the relational database to produce a set of playback call records comprised of a call signature and a conversation result associated with the target application identified by the user.

15. The method of claim 14, further comprising watching the runtime software call stack for a runtime call signature originating from the target application to the one or more external applications and to search the playback call records for an exact match between the runtime call signature and a call signature of the playback call records.

16. A system for managing software dependencies during software testing and debugging, the system comprising:

a processor;

a memory in communication with the processor, the memory comprising, a java virtual machine (JVM) configured to execute at least one target application and one or more java software applications external to the target application, the JVM configured to implement a Java Platform Debugger Architecture (JPDA) and execute a test harness plugin, wherein the target application is dependent on the one or more external applications to complete, the one or more external applications excluding an operating system supporting the JVM;

the test harness plugin comprising, a capture module configured to capture a software call stack of a software execution environment, the software call stack comprising a plurality of software calls from a target application to one or more external applications, each software call of the software call stack comprising a call signature and a call result; and capture a pre-call global variable set representative of a state of global variables in the software execution environment prior to calling the one or more external applications and capture a post-call global variable set representative of a state of the global variables in the software execution environment after calling the one or more external applications;

a determination module configured to define a set of proxied software calls within the captured software call stack suitable for simulating conversation responses to runtime software calls by the target application; and a playback module configured to monitor a runtime software call stack and determine whether a runtime software call by the target application to the one or more external applications is within the defined set of proxied software calls, the playback module configured to respond to the runtime software call with a captured call result corresponding to the runtime software call in response to recognizing the runtime software call as being within the defined set of proxied software calls;

the playback module configured to ignore the runtime software call and to continue monitoring the runtime software call stack in response to not recognizing the runtime software call as being within the defined set of proxied software calls; and the playback module configured to adjust global variables in the software execution environment to reflect the values of global variables in the post-call global variable set.

17. The system of claim 16, wherein the determination module comprises a user interface module configured to present the captured software call stack to a user, and an identification module configured to identify in response to user input, the set of software calls from the target application within the captured software call stack that reference a particular external software application, the target application defined by the user.

18. The system of claim 16, wherein the capture module is further configured to store each software call of the software call stack in persistent storage, each software call comprising at least a call name, a call parameter set, and a call result.

19. A method for managing software dependencies during software testing and debugging, the method comprising:

providing a set of proxied software calls from a target application within a software call stack that reference one or more external software applications, the software call stack captured from a first software execution environment, the software call stack comprising one or more software calls from the target application to one or more external applications, each software call of the software call stack comprising a call name, a call parameter set, and a call result, wherein the target application is dependent on the one or more external applications to complete, the one or more external applications excluding an operating system;

capturing a pre-call global variable set representative of a state of global variables in the software execution environment prior to calling the one or more external applications and capturing a post-call global variable set representative of a state of the global variables in the software execution environment after calling the one or more external applications;

executing the target application within a second software execution environment, at least one of the one or more external software applications inaccessible to the target application executing within the second software execution environment;

monitoring a runtime software call stack and determining whether a runtime software call by the target application to the one or more external applications is within the set of proxied software calls;

responding to the runtime software call with a captured call result corresponding to the runtime software call in response to recognizing the runtime software call as being within the set of proxied software calls, such that the captured call result substitutes for a runtime call result of the runtime software call; and ignoring the runtime software call and continuing to monitor the runtime software call stack in response to not recognizing the runtime software call as being within the set of proxied software calls; and adjusting global variables in the software execution environment to reflect the values of global variables in the post-call global variable set.

\* \* \* \* \*